United States Patent [19]

Smith

[11] Patent Number: 6,047,876
[45] Date of Patent: Apr. 11, 2000

[54] PROCESS OF USING AN ACTIVE SOLDER ALLOY

[75] Inventor: Ronald W. Smith, Blue Bell, Pa.

[73] Assignee: Materials Resources International, North Wales, Pa.

[21] Appl. No.: 09/151,489

[22] Filed: Sep. 11, 1998

Related U.S. Application Data

[60] Provisional application No. 60/058,673, Sep. 12, 1997.

[51] Int. Cl.⁷ .............................. B23K 1/00; B23K 1/19; B23K 35/26

[52] U.S. Cl. ................................ 228/111.5; 228/124.5; 228/256; 228/262

[58] Field of Search ............................ 228/111.5, 124.5, 228/235.1, 246, 256, 262

[56] References Cited

U.S. PATENT DOCUMENTS

| | | |
|---|---|---|
| 4,451,541 | 5/1984 | Beal . |
| 4,785,989 | 11/1988 | Mizuhara et al. . |
| 5,011,511 | 4/1991 | Beck . |
| 5,598,966 | 2/1997 | Romano et al. . |
| 5,695,861 | 12/1997 | Bloom . |

FOREIGN PATENT DOCUMENTS

| | | |
|---|---|---|
| 193 612 | 11/1957 | Austria . |
| 0 235 546 | 9/1987 | European Pat. Off. . |
| 0 652 072 | 5/1995 | European Pat. Off. . |
| 809 972 | 8/1951 | Germany . |
| 1 128 672 | 4/1962 | Germany . |
| 2 235 376 | 2/1974 | Germany . |

OTHER PUBLICATIONS

German Search Report dated Nov. 12, 1996.

A. P. Xian, "Precursor film in a metal–ceramic wetting system," Welding In The World, vol. 30, No. 9/10, Sep. 1, 1992, pp. 243–251.

U.S. Patent application No. 08/983,472, Filed Apr. 23, 1998.

International Search Report dated Dec. 22, 1998.

*Primary Examiner*—Samuel M. Heinrich
*Attorney, Agent, or Firm*—Ratner & Prestia

[57] ABSTRACT

A process for joining workpieces by active soldering. The process includes cleaning the surfaces of the workpieces to be joined; heating the workpieces to be joined; placing an active, low-temperature solder material on at least one of the surfaces of the workpieces to be joined; mechanically activating the molten solder material, to break oxide films on the solder material, while the solder material contacts the surfaces of the workpieces to be joined; assembling the surfaces of the workpieces to be joined; and applying pressure to the surfaces of the workpieces to be joined both while the solder material is molten and as the solder material cools to a solid.

39 Claims, No Drawings

PROCESS OF USING AN ACTIVE SOLDER ALLOY

This application claims benefit of Provisional application Ser. No. 60/058,673 filed Sep. 12, 1997.

FIELD OF THE INVENTION

The present invention relates generally to the process of joining components together and, more particularly, to a process which mechanically activates "active," low-temperature solder materials.

BACKGROUND OF THE INVENTION

The process of soldering is one of the most widely used joining techniques. Even wider use of soldering for joining workpieces would be possible absent several limitations inherent in conventional solder processes. Typically, conventional solder processes can be used successfully only (1) if the surfaces of the workpieces to be joined are cleaned and free of oxides before application of the solder, to free the surfaces of any oxide layers present and ensure good contact between the solder and the workpiece surfaces; (2) if a precoating with a flux is used at the same time as the solder; or (3) if the workpiece surfaces are cleaned and a precoating with a flux is used. These limitations mean that the workpiece surfaces to be soldered require a complicated pretreatment, that the soldering operation is made more complex by the use of added flux, or both. In addition, the risk exists that, after the soldering process, flux residues will remain on the soldered workpiece surfaces. Residual flux may cause problems in further processing steps or impair the long-term durability of the soldered joints. Finally, some soldering processes are hazardous to health, the environment, or both.

Some commercial soldering processes use soft solder alloys, which comprise tin and/or lead and possibly silver, and have a process temperature of about 200° C. These processes have the further limitation that they wet many materials either not at all or only very poorly. Therefore, these processes cannot be used to join workpieces comprised of poorly wettable or entirely nonwettable materials such as ceramics.

Some soldering processes attempt to overcome this limitation by using "activated" soft solders comprising an admixture of the soft solders with titanium (an "active" metal). These processes have significantly improved wetting characteristics. A serious limitation of these processes is, however, that they require process temperatures between 600° C. to 900° C. and require a high vacuum or a pure shielding gas. The high processing temperature severely limits the choice of solderable materials. Furthermore, the need for a vacuum or shielding gas complicates the soldering operation and, in many cases, precludes application of the process at all. For certain special cases, the process of eutectic copper bonding can be used; this process is even more expensive and complicated.

Therefore, an object of the present invention is to provide a soldering process, for joining workpieces, which enables more versatile applicability of the soft-solder technique. More specific objects of the present invention are to provide a soldering process that functions even in oxygen-containing atmospheres such as, for example, in air; has a relatively low processing temperature; and wets even poorly wettable surfaces. Still another object of the present invention is to provide a process that avoids the need for a flux.

SUMMARY OF THE INVENTION

To meet this and other objects, and in view of its purposes, the present invention provides a process for joining workpieces by active soldering. The process includes cleaning the surfaces of the workpieces to be joined; heating the workpieces to be joined; placing an active, low-temperature solder material on at least one of the surfaces of the workpieces to be joined; mechanically activating the molten solder material, to break the oxide film on the solder material, while the solder material contacts the surfaces of the workpieces to be joined; assembling the surfaces of the workpieces to be joined; and applying pressure to the surfaces of the workpieces to be joined both while the solder material is molten and as the solder material cools to a solid. Examples of "mechanical activation" within the scope of the present invention include: (1) manual or automated brushing, (2) an ultrasonic bath in which molten solder is transferred under the cavitational forces associated with ultrasonics in liquids, (3) friction deposition which transfers the solder to other surfaces under pressure and high relative surface speeds, (4) thermal spray in which molten droplet aerosols transfer molten solder to the surfaces to be joined, and (5) ultrasonic press.

It is to be understood that both the foregoing general description and the following detailed description are exemplary, but are not restrictive, of the invention.

DETAILED DESCRIPTION OF THE INVENTION

A specific solder alloy is disclosed in International Patent Application No. PCT/EP96/03037, which was published under No. WO 97/03789. The U.S. national phase application corresponding to the international patent application, U.S. application Ser. No. 08/983,472, is incorporated herein by reference in its entirety. The disclosed alloy is commercially available from Materials Resources International (MRI) of North Wales, Pa. under the trademark SuperBraze™. The SuperBraze™ alloy is a Sn—Ag—Ti based "active" braze-solder that brazes in a temperature range from 250° C. to 280° C. (480 to 540° F.), therefore defining it as a solder. This temperature range is relatively low and the alloy is typically used for wetting and universal joining. MRI also makes available a SuperBraze™ alloy which substitutes zinc (Zn) for tin (Sn) and has a higher temperature range. Whether the low- or high-temperature alloy is used, elements added to the SuperBraze™ alloy make the alloy an active joining compound—a characteristic normally reserved for brazes. Another supplemental solder alloy can be used to fill gaps or provide fillets.

More specifically, the SuperBraze™ alloy comprises at least 1% by weight of an element or a mixture of elements of subgroup IVa and/or Va of the Periodic Table of the Elements (the elements titanium, zirconium, hafnium, vanadium, niobium and tantalum, of which titanium is preferred), at least 0.01% by weight of an element or a mixture of elements of the lanthanide group (cerium, praseodymium, neodymium, gadolinium and ytterbium, of which cerium is preferred), optionally at least 0.5% by weight of silver or copper or indium or a mixture of silver and/or copper and/or indium, optionally at least 0.01% by weight of gallium, and the remainder tin or lead or a mixture of tin and lead, and possibly of the usual impurities.

The active nature of the SuperBraze™ alloys eliminates the need for fluxes and the combinations of elements which are added to the base alloy to permit joining under normal air conditions (without the need for a protective environment) regardless of the base materials. Because the SuperBraze™ alloys are active joining materials, they are excellent joining compounds with a special formulation for reacting with a wide range of surface compounds, including oxides which normally exist on most metal and ceramic surfaces. The interface reactions, made possible by the unique composition of the SuperBraze™ alloys, activate the necessary conditions for surface wetting and bonding between most solderable materials, including those listed in Table 1 below.

The SuperBraze™ alloys can be used at temperatures which range from cryogenic temperatures to 400° C. (750° F.). Demonstrated joining combinations are shown in Table 1 below:

TABLE 1

Demonstrated Joining Combinations For SuperBraze ™ Alloys

| Base Material | Joined to: | Base Material | Joined to: |
|---|---|---|---|
| Aluminum | Aluminum | Steel | Stainless Steel |
|  | Copper |  | WC/Co, WC/Ni |
|  | Steel |  | Diamond/Composites |
|  | Stainless Steel |  | Nickel Alloys |
|  | Cast Iron |  | Cast Iron |
|  | Aluminum Oxide |  |  |
|  | Zirconia |  |  |
|  | Magnesium | Inter- | TiAl, Ti$_3$Al |
|  | Titanium | metallics | NiAl, Ni$_3$Al |
| Copper | Ni, Al, | Composites | Al:SiC |
| Alloys | Ti, Steel graphite |  | Al: Alumina |
|  |  |  | Ni: Carbon |
|  |  | Ceramics | Al$_2$O$_3$, ZrO$_2$ |
| Magnesium | Al, Steel |  | Nitrides (Si, Al, Ti) |
| Alloys | Ni alloys |  | Carbides (Ti, Cr, W, Mo) |
|  | Graphite |  | Silicides (Mo, Ti) |
|  | Carbon:Carbon |  |  |
| Titanium | Titanium | Carbon | Carbon:Carbon |
| Alloys | Magnesium |  | Graphite |
|  | Nickel Alloys |  | Aluminum |
|  |  |  | Copper |

As illustrated by Table 1, the SuperBraze™ alloys can be used to join a wide range of materials. The low processing temperatures of the SuperBraze™ alloys nearly eliminate oxidation during brazing and significantly lower joint cracking that may come from thermal strains due to the differing coefficients of thermal expansion of dissimilar materials. The SuperBraze™ alloys can be joined to a variety of other materials due to their active nature and the low brazing temperatures. New combinations of materials joining are continually being demonstrated in a wide variety of applications.

Finally, the ease of use and flexibility of the SuperBraze™ alloys make them versatile. The SuperBrazem alloys find applications in heat exchangers, electronic fabrications, personal computer circuit boards, feedthroughs, wire bonding, sports equipment, housewares, aerospace, pumps, seals, cutting and drilling tools, tooling and dies, brake housings, and chemical processing—among other applications. In view of the many advantages of the SuperBraze™ alloys, a need exists for a suitable process of using these solder alloys.

In general, the process of the present invention transfers the solder alloy using mechanical activation. Thus, the invention is directed to processes by which SuperBraze™ joining alloys are used and by which the technique of mechanical activation is incorporated into the joining process. SuperBraze™ alloys do not flow or wet like conventional solders or brazes because the alloys are active. Such active alloys contain reactive elements that enable direct wetting and bonding onto oxides and other ceramic-like layers that typically exist on many corrosion-resistant metals such as aluminum, titanium, and stainless steel. It is well known that such active alloys do not flow; therefore, a process able to distribute the active solder alloys becomes important.

The process of the present invention is more like "gluing" than conventional soldering or brazing. The process first activates and then flows, spreads, or pre-places the solder alloy by a range of mechanical techniques, including brushing, thermal spraying, friction coating, ultrasonic bath dipping, solder pre-placement and pressure, ultrasonic press, and abrasion transfer. The workpieces to be joined together are held while bonding is mechanically and thermally activated. In a sense, therefore, the process of the present invention uses the solder alloy as a metal glue.

A. Advantages

The process of the present invention is suitable for a wide range of materials and joint geometries. The joint geometries must permit pre-placement, however, of the solder alloys in the joints before assembly. As is typical with active braze alloys, the alloys do not have the capillarity of conventional brazes and solders. The lower melting temperatures, 250° C. to 450° C. (480–840° F.), reduce the dependency on more expensive heating elements, thus reducing the overall cost of producing high-quality bonds. Other advantages of the process of the present invention include: (1) no flux is needed; (2) braze joining in open air is possible; (3) dissimilar material joining is made easier; (4) lower costs than conventional active brazing; (5) less thermal expansion problems, from low joining temperatures; (6) little or no surface oxidation due to the low joining temperatures; (7) limited capillarity prevents extensive running of braze into adjacent areas; and (8) the solder alloys are ductile and have demonstrated shear strengths over 6,000 psi.

B. Available Forms of Solder Alloys

The solder alloys used in conjunction with the process of the present invention may be formed as a paste or tape made from a combination of metallic powders and suitable binders. The paste is mixed, just before use, to the required consistency (typically 8 parts powder to 1 part binder by weight). The paste is applied via syringes or by automated dispensers to one of the surfaces to be joined and then distributed evenly before the surfaces are joined. The prepared surfaces of the joint are then assembled and the balance of the process is completed. Tapes are flexible, solid mats made from polymer binders with SuperBraze™ powders, which can be cut and pre-placed in the joints to be assembled.

Shot or pellets of the solder alloys also may be formed. The shot or pellets is or are melted and then "brushed" onto both of the opposing faces of the surfaces to be joined. The molten alloys require vigorous brushing in order to disturb oxide films and the final layers need to be both thin, typically about 0.05 mm (0.002 inches), and uniform.

The solder alloys may be formed as ribbon or foil. Typically, thin (about 0.076 mm (0.003 inches)) foil sheets are created from roll-formed solid solder alloy. The foil can be cut and placed in the joints before assembly in order to retain close tolerance joint gaps. Sheet and wire forms of the solder alloys can be extruded or rolled from the low-temperature form of the solder alloys. The sheet and wire forms can be melted in place or pre-placed on the surfaces to be joined. Layers of the solder alloys can be transferred by placing the solder alloys under pressure against high surface speed base materials.

C. General Processing Comments

As mentioned above, the solder alloys used in connection with the process of the present invention are active joining materials and, thus, compared to other conventional solders, they have low capillarity. Therefore, for many joint configurations, the solder alloys must be initially placed in the joint as paste or tapes; brushed-in, re-melted layers; or a foil or sheet. After heating to the joining temperature, 250–280° C. (480–540° F.), the joint must then be subjected to pressure in order to extrude (push) the molten solder alloy throughout the joining interfaces. The processing steps described in detail below have been developed to address these characteristics of the solder material.

For non-uniform joint gaps; low-tolerance joint gaps which are too wide (typically >0.05 mm (0.002 inches)) for the low-temperature form of the solder alloy to bridge; where added capillarity is needed; or where fillets are required, additions of a supplemental filler material may be necessary. A commercially available filler material, composed of about 96.5% tin and 3.5% silver or other tin- or lead-based solder, has been found suitable for this purpose. The filler material has the capillarity required to fill joints now accessible by pre-placement and wicks up solder alloy pre-wetted surfaces. The wicking creates natural fillets and distributes the solder alloy more evenly through non-uniform gaps. The filler material is also available as paste, foil, wire, or preforms from wire or foil to be compatible with the solder alloy.

A variety of conventional techniques are suitable for heating the alloy according to the present invention. Such techniques include, for example, a soldering iron or flame, plate heating, hot-air heating, ultrasonic heating, and induction or resistance heating. The solder temperature can be influenced by the addition of one or more components, such as silver, copper, indium, or gallium, to the solder alloy. The solder temperature can also be influenced by the choice of remainder component, i.e., tin or lead or a mixture of lead and tin, in the solder alloy. The processing temperature of tin solders, whose remainder component consists at least predominantly of tin, is generally between 220 and 350° C.; the soldering temperature of lead solders, whose remainder component consists at least predominantly of lead, is generally between 320 and 450° C.

D. Joining Steps

1. Surface Preparation

To join metals, intermetallics, oxides, and ceramics, the surfaces of the materials must be cleaned to remove loose particles. Then, the surfaces may be roughened to about 0.003 mm (120 μinches) by sanding or light grit blasting. This roughening step may be eliminated, however, depending on the base materials. Finally, the surfaces are prepared by treating them with alcohol or another solvent to remove greases. Following surface treatment, the solder alloy is applied (Step D.2 below) and then the joint is formed (Step D.3 below).

2. Alloy Application

As previously stated, the solder alloys used in connection with the process of the present invention require pre-placement onto one or both of the surfaces to be joined. If the surfaces to be joined have close tolerance gaps, typically 0.076±0.025 mm (0.003±0.001 inches), capillary filling is not needed. Such gap tolerances require flat, parallel, or concentric surfaces which can be held together during braze joining. If wider gaps or less tolerance is needed, then a filler material may supplement the solder alloy to add capillarity once the solder alloy has wet the surfaces to be joined.

The solder alloy is uniformly distributed as pre-placed foil sheets or wires; as paste or tape; or as a thin, brushed-on layer. The alloy must be mechanically activated (disturbed) to release its "active" mechanism. This activation initiates the reactions which enable surface wetting. A variety of activation steps may be used in the process of the present invention, depending on the joint size and geometry, desired joint quality, and manufacturing preference. Five specific activation steps have been identified as suitable for incorporation in the process of the present invention: brushing, ultrasonic bath coating, friction coating, thermal spray, and ultrasonic press.

For manual or small lot joining, a brushing technique may be the preferred choice. Ultrasonic bath coatings activate wetting on dipping in molten baths. Friction coating uses local pressure and high relative surface speeds. Thermal spray, compatible with powders and wires, may be used to activate bonding with droplet impacts. For tapes, pastes, or foils, direct application must be followed by sharp, rapid agitation (mechanical activation) such as that delivered by ultrasonic probes directed at the interfaces. Each of these specific activation steps is discussed more fully below.

(a) Brushing (Shot/Wire/Sheet)

In one embodiment of the present invention, involving pre-wetting or coating, the solder alloy pellet or shot is melted in a "solder pot" or the wire or sheet is applied directly to the heated surfaces. The surfaces to be joined must be heated to 250–280° C. (480–540° F.). Hot plates, air furnaces, flames, induction, or hot air heaters may all be used depending on their availability, on the geometry of the parts and fixturing, or on both considerations. Specific processing temperatures and conditions can be developed for a wide range of material joint combinations. Temperature indicating "paints" can be supplied to assist in monitoring joining temperatures more accurately. Heating over 300° C. (575° F.) will oxidize many metals and may lower the quality of the joint.

After the solder alloy is melted, the molten alloy is distributed over the two surfaces to be joined and then brushed on with a vibrating tool, porous metal brush, wire brush, or spatula. The oxide film that floats on the molten alloy surface should not be captured. If it transfers to the joining area, this oxide may reduce the final quality of the joint. After the molten alloy is transferred or painted onto the surfaces, the solder alloy is mechanically worked into each of the two opposing surfaces of the components to be joined. If the solder alloy is properly applied, a metallic layer which adheres to the surfaces of the components will be observed. Excessive oxidation or loose surface scales may prevent the layer from adhering. Increased surface roughness or more rigorous mechanical activation may solve the adherence problem. If the solder alloy layer is adhering, the layer is then uniformly distributed with the tool, brush, or spatula Some raised solder alloy may remain; these raised areas will join into the opposing surfaces after the joint is assembled and joined.

As previously mentioned, capillary filling may be needed when lower tolerance gap joints or fillets in the final joints are required. The filler material can be added over the solder alloy layer as a supplemental brazing layer. This may be done with wire, which is directly added to the molten solder alloy pre-wetted surface while it is still at a temperature between 250–450° C. (480–840° F.).

(b) Ultrasonic Bath Coating

Solder oxide films can be continuously disrupted by the cavitation processes that occur in ultrasonically agitated fluids. In this embodiment of the present invention, solder alloy is melted in a heated pot that has ultrasonic probes attached. Normally operating between 20 to 40 kHz and from 200 to 2,000 watts power, the ultrasonic probe directs acoustic energy into the molten solder alloy bath. The acoustic energy interacts with surfaces which are immersed in the fluid where cavitation (bubbles) mechanically impact the surface. It is this cavitation action which mechanically activates the solder alloy, continuously disrupting the oxide films that may form on the molten solder alloy. This action of film disruption continually exposes the molten solder alloy to the surfaces to be joined. After the joining surfaces are immersed into the molten solder alloy long enough for their temperatures to reach about 250° C., the ultrasonics are activated and left on from 1–100 seconds. This time period is long enough for a solder alloy coating to be transferred to the joining surfaces.

The result of ultrasonic bath immersion is to transfer about 0.025–0.25 mm (0.001–0.010 inches) of solder alloy to the surfaces to be joined. Normally, both surfaces that are to be joined are pre-coated either by ultrasonic bath immersion or by some other embodiment (such as brushing or spraying) of the present invention. Ultrasonic coating of the solder alloy may also be a precursor or pre-coating step in preparation for conventional solder joining, discussed below in the section titled "Actual Joining."

(c) Friction Coating

As in the previous ultrasonic immersion embodiment, the goal of the friction coating embodiment of the present invention is to transfer a layer of solder alloy to the surfaces to be joined. The friction coating process uses local pressure and s high relative surface speeds, via rotation or translation, to create high interfacial friction between a solder alloy applicator and the surfaces to be joined. The friction forces create local heating which locally melts the solder alloy onto the surfaces to be coated, leaving very thin films about 0.0025–0.025 mm (0.0001–0.001 inches) thick. Again, as in ultrasonic coating, both surfaces to be joined may be coated using the friction coating process or by some other mechanism. Friction coating of the solder alloy may also be a precursor or pre-coating step in preparation for conventional solder joining, discussed below in the section titled "Actual Joining."

(d) Thermal Spray

This thermal spray embodiment of the present invention uses either wire or powder solder alloy forms that are melted during the thermal spray process into fine dispersions of molten solder alloy droplets. These droplets are accelerated by gas jets to speeds in excess of 15 m/second (50 ft/second). These high droplet speeds then lead to solder alloy oxide film disruption (mechanical activation) as the droplets hit the surfaces to be coated. The droplet impact and spreading constitute the mechanical activation required to wet any of the types of surfaces to be joined. Thermal spray processes that can be used include flame spray, wire arc, high velocity oxy-fuel, and plasma spray. These processes are compatible with solder alloy powders and wires. Again, the objective of the thermal spray embodiment of the present invention is to transfer about 0.0025–0.025 mm (0.0001–0.001 inches) thick solder alloy layers (i.e., a coating) to the surfaces to be joined.

(e) Ultrasonic Press (Pastes, Foils, & Other Solidified Solder Alloy Forms)

When solidified or in the molten state, the solder alloy forms a thin, protective oxide skin. This skin must be disturbed. Ultrasonic horns transmit acoustic energy (about 20 kHz) to the solder alloy interfaces and must be used with pastes or other solid forms of the solder alloy, including re-solidified, brushed-on layers. If the brushed-on layers are immediately joined while still molten, and the joining steps outlined below are followed, ultrasonic activation is not required. On the other hand, ultrasonic bath coating, friction coating, thermal spray, and ultrasonic press activation may be used when manual brushing methods are not compatible with production or assembly techniques. The procedures for the use of ultrasonics are described below.

Distinguish the use of ultrasonics in the process of the present invention from the technique of ultrasonic soldering. The process uses ultrasonics to break the oxide film on the solder material and, therefore, to mechanically activate the solder material. In contrast, the ultrasonic soldering technique functions to break oxides on the surfaces of the components to be joined—not in the solder material itself. The solder alloy used in the ultrasonic process of the present invention does not require oxides on the surfaces of the components to be broken.

When working with pastes, the solder alloy powders are premixed with the binder for the desired consistency within 24 hours of the joining process. A typical mixture is 8 parts powder to 1 part binder by weight. The binder is also premixed with water to a desired consistency, typically 1 part binder to 1 part water also by weight. Consistency is determined by the application technique. Once mixed, the solder alloy paste can last for one week or more, provided the paste container is sealed. Once the paste dries, additional water can be added. Such addition is not generally recommended, however, because the binder is not completely resoluble.

Syringes work well as an application device. The solder alloy and binder mixtures can be poured into the syringes and then "squeezed" out for the desired quantity. Automated paste applicators can also be used and, depending on application rates, differing consistencies can be mixed. Powder-binder paste mixtures are flexible, but the lower the binder and water content in the paste, the more consistent the joining process. The binder must be dried and "burned" off and the water solvent volatilized. The outgassing of the water (steam) may lead to porosity in the joints if it evolves too fast due to rapid heating before the solder alloy paste is fully dried. This drawback can be eliminated by using longer drying times.

The paste is uniformly applied to only one of the surfaces to be joined. The application amount should be about 0.0047 g/mm$^2$ (3 gm/in$^2$) or about 0.25 mm (0.010 inches) thick. The surfaces to be joined are assembled while the paste is still wet. Once the two surfaces are assembled, slight pressure is applied—enough to distribute the paste evenly in the joint and to pre-compact the paste before drying. To eliminate the possibility of joint porosity, the assembled joint is dried slowly. This can be done at room or elevated temperatures not exceeding 85° C. (185° F.) in order to prevent steam from forming as the water in the binder volatilizes. Once the joint is thoroughly dried, the joint can be processed as indicated below.

3. Actual Joining (a) Pressure (For Pre-Wetted, Molten Surfaces)

Pressure is an essential part of the process of the present invention using the solder alloys identified above. Active brazes and solders, such as the SuperBraze™ alloys, do not flow by capillary action. Thus, pressure is needed to extrude the molten alloy along the joining interfaces. Only sufficient pressure to overcome surface tension and viscosity is needed. Typically, the brazing joint pressures for the Super-Braze™ alloys range from 10–60 psi. Specific pressures can be determined for the variety of material joint combinations found in application. Pressure must be applied while the solder alloy is molten and cooled and must be held until the braze is solid.

Any of the application process steps, described in Steps D.2(a–e) above, can be immediately followed by pressure application provided the solder alloy layer is kept molten after application. In this technique, the solder alloy wetted surfaces, after they are placed together, must be pressed together with tooling or in a press while the parts are still at the brazing/melting temperature for the solder alloy (which ranges from 250° C. to 450° C. (480–840° F.) depending on the type of solder alloy). Once the pressure is applied, the joined interface is mechanically agitated (activated), and the predetermined brazing times are met, then the components are cooled while maintaining the required pressure until the temperatures are at least 50° C. (120° F.) below the brazing temperatures.

Relative motion, under slight pressure, is another form of mechanical activation which can disrupt oxide films during joining of the solder alloy wetted surfaces. Oscillatory or rotational motion can be used to affect such bonds while slight pressure is applied. Pre-applied or pre-placed solder layers can be activated for joining in such ways.

(b) Ultrasonic Press (For All Solid Surfaces)

If brushing or pre-wetting are not acceptable or the production technique is not compatible with brushing, then pre-placed preforms such as pastes or foils can be used, following the method of Step D.2(e) above. Once the solder alloy is solid, the oxide film must be disrupted. Thus, powders, foils, and sheet or re-solidified solder alloy layers which are placed in joints must be disrupted with ultrasonic energy while pressure is applied. Ultrasonics at 20 kHz and power densities from 500–2,000 watts disrupt these oxide films and permit surface wetting without brushing. For pastes, ultrasonic energy is required to pack the powder particles, disrupt the individual particle oxide scales, and distribute the molten solder alloy.

Pressure is still required to supplement the ultrasonic energy. The solder alloy wets with ultrasonic activation, but the molten layer must still be pressure extruded because capillary action will not carry the solder alloy throughout the joint. As in the step above, pressures from 10–60 psi are needed while ultrasonic energy is provided to the component interfaces. Mechanical energy (activation) via ultrasonics is transferred into the components via acoustically tuned horns. The horn size can be designed to match the surfaces of the components being joined or the horn can be scanned over the component surface as the parts with the pre-placed solder alloy (powder, foil, or sheet) are at temperature (250–450° C. (480–840° F.)) and a sufficient pressure is applied. The suitable temperatures, times, ultrasonic energy levels, duration, and pressures can be determined for a specific application.

In this technique, the surfaces which have the pre-placed solder alloy pastes, foils, sheets, or re-solidified layers, after they are put together, must be held together with tooling and placed in a press while the parts are still at the brazing/melting temperature. Once the pressure is applied, the ultrasonic horn must be brought in contact with the outer surfaces in order to transmit the ultrasonic energy to the interfaces which contain the solder alloy preforms or pastes. Once the horn is in contact, the ultrasonic energy is activated (about 20 kHz/normal wave/500–2,000 watts) in order to break the solder alloy oxide scales. The wetting action is released and the solder alloy wets the faying surfaces. Simultaneously, with the pressure applied, the solder alloy is extruded across the interface. The joint is held at temperature for the predetermined brazing time, then the joined components are cooled while maintaining the required pressure until the temperatures are at least 50° C. (120° F.) below the brazing temperatures.

(c) Combination With Conventional Solders

The process of the present invention first uses one or more of the specific embodiments discussed above, incorporating the SuperBraze™ alloy and the mechanical activation steps, to apply the solder alloy. After coating, the surfaces to be joined are assembled in a joint configuration (e.g., tube/tube, tube/sheet, lap joint, t-joint) then conventional solder joining is applied. Conventional soft solders such as lead, tin-silver, tin-antimony, tin-copper, lead-tin, and the like can be pre-applied without the use of fluxes. In the process of the present invention, SuperBraze™ alloy layers are mechanically activated onto other surfaces (metal, ceramic, intermetallic, or composite) and then are reheated to over 250° C. where other soft solders are melted and applied/reflowed directly over the SuperBraze™ pre-coating. Conventional soft solders normally require strong chemical fluxes on base materials such as titanium, aluminum, or stainless steel and cannot wet or bond ceramic materials. Conventional solders flow into small spaces and crevices and joints that are typically used in braze or solder joining. Thus, the joining process of the present invention can be substituted into existing solder or braze processes. In this embodiment, one of the embodiments of the present invention precoats surfaces, replacing other types of pre-coating such as gold or nickel plate or the moly-manganese metallization coating process for coating ceramics and glass prior to solder joining.

(d) Example

The following example is included to more clearly demonstrate the overall nature of the invention. The steps provide one example of the process of the present invention and are exemplary, not restrictive, of the invention. First, all surfaces to be joined are roughened with grit. The surfaces are then cleaned with a suitable cleaning agent. Because they must be clean, dry, and free of oil, wax, or grease, the surfaces should not be touched after cleaning.

A hot plate or other heating device is pre-heated to 250° C. (480° F.) while exercising caution appropriate for such high-temperature work. One or more spots of temperature-indicating paint is or are placed on each part to be brazed. Suitable paints are available under the trademark Tempilaq, such as Tempilaq 240° C. (488° F.) and Tempilaq 260° C. (525° F.), from Tempil Division of Air Liquide America Corporation of South Plainfield, N.J. The paint spots should be applied to an area of each workpiece that will not contact the solder material (i.e., to the side of the material). The parts are placed on the hot plate or other heating device until the proper temperature is achieved. For example, the parts can be brazed when the Tempilaq 240° C. (488° F.) melts but, if the Tempilaq 260° C. (525° F.) melts, the materials are too hot and must cool to below 260° C. (525° F.) before the solder alloy is applied. The required brazing temperature range is between 253° C. (488° F.) and 274° C. (525° F.).

Next, a crucible is half-filled with solder alloy pellets. The crucible with the solder alloy pellets is inserted into a melting pot. The melting pot is heated and the material allowed to come to a full melt. (Any unused solder material can be re-melted for use at a later time.) A vibrapeen device is used to stir the solder material. The solder material is then applied to each part to be brazed using the vibrapeen tool by following these steps: (1) the solder material is scooped out of the crucible with a spatula, (2) the spatula is placed in contact with the parts, and (3) the vibrapeen tool is turned on and the parts are covered with a layer of alloy material. Of course, direct melting of pellets or other forms of solder alloy can be practiced before spreading is begun.

Finally, the parts are placed on a hot plate or in another heating device in a configuration that meets the requirements of a particular application. Sufficient pressure is placed on the assembled joint to maintain constant contact between the parts and the heat is completely turned off. The assembled joint should not be disturbed or removed from the heat source. Rather, the joint is allowed to cool completely before removing the assembled joint from the heating device.

E. Related Equipment

Each of the manual or automated brushing, ultrasonic bath coating, friction coating, thermal spray, or ultrasonic press embodiments of the process of the present invention may be used to produce a wide variety of joint combinations. Some attention must be given to fixturing and a press or tooling for maintaining pressure and assuring agitation. For ultrasonic application, an ultrasonic transducer or horn, similar to that used for plastics welding, and a power supply are needed. The horn can be sized and matched for different component size, geometry, and material combinations.

The equipment useful to practice the various embodiments of the process described above can be provided in several kits. A kit suitable to practice the pressure-brush process, for example, would include solder alloy shot, crucibles, brushes, spatulas, and instructions. Melting pots, furnaces, tooling, or a press are all optional. A kit suitable to practice the wire-brushing process, for example, would include solder alloy wire, brushes, spatulas, and instructions. Again, melting pots, furnaces, tooling, or a press are all optional. A paste-ultrasonic process kit would include, for example, solder alloy powder or paste with water-soluble binder, covered containers for mixing, spatulas, syringes, and instructions. Ultrasonics, furnaces, tooling, or a press are all optional. Finally, to perform the foil-ultrasonics process, the kit would include, for example, about 0.076 mm (0.003 inch) solder alloy foil strip and instructions. Again, ultrasonics, furnaces, tooling, or a press are all optional. Additional equipment helpful in practicing the process of the present invention would include a hot press for brush-on shot or wire (including melting pots and a surface heater), an induction hot press, an ultrasonic hot press, thermal spray devices, ultrasonic solder pots, turning centers, x-y tables, an ultrasonic induction hot press, an ultrasonic press and horns, tooling, and fixturing.

The process of the present invention can be used to join a multiplicity of metallic and nonmetallic materials, even oxidic and nonoxidic ceramic materials, to themselves or to other materials. The process can advantageously be carried out in any ambient atmosphere, including an oxygen-containing atmosphere such as air. It is not necessary to use a vacuum or a shielding gas atmosphere to conduct the soldering process. Furthermore, in general it is not necessary to use a flux. The processing temperature according to the invention is relatively low: at most 500° C. and preferably between 200 and 450° C. In contrast to the known process which apply activated soft solders, therefore, the processing temperatures of the process according to the present invention are reduced significantly. The process of the present invention can be used to join surfaces which are poorly wetable. Application of the process of the present invention is no more expensive, or at least minimally more expansive, than that of known soldering processes.

The soldering process according to the present invention finds application in a wide variety of sectors, including sectors dominated by adhesive joints. The process can be used, for example, to produce soldered joints, without difficulty, between copper and steel or cast iron-carbon alloys. The process also makes it possible to solder copper onto a silicon workpiece, for example a semiconductor wafer. Thus, the process according to the present invention finds numerous applications in semiconductor electronics, both in microelectronics and in the power electronics sector.

In addition to the application in which, for example, a copper sheet is soldered to a silicon wafer, the process according to the present invention can also be used to solder a workpiece made of copper and a workpiece made of aluminum nitride. Aluminum nitride is a good insulator whose insulating characteristics are comparable to those of the widely used insulator aluminum oxide, but which has a distinctly higher thermal conductivity than aluminum oxide. Thus, the process according to the present invention can be used to produce a joint having good thermal conductivity between a power semiconductor and an aluminum nitride workpiece. The aluminum nitride workpiece dissipates the lost heat of the power semiconductor element into a base, while at the same time ensuring electrical insulation with respect to the base.

The process according to the present invention can also be used, for example, to solder a copper sheet onto a support made of silicon, aluminum nitride, or fiber-reinforced carbon. Subsequently, further metallic components can be soldered to this copper sheet in a known manner using commercially available solders. The process according to the present invention can also be used to join aluminum workpieces to one another or to copper or steel components or components made of cast iron-carbon alloys such as cast iron or cast steel. Therefore, the process can advantageously be used in plumbing technology, for example, to join components during the construction or repair of coolers or heat exchangers or to fit temperature sensors, ensuring good thermal conductivity, in heating and hot-water installations.

Ceramic-to-metal and glass-to-metal seals for feedthroughs, instruments, and sensors can be joined with the processes described by this invention. Glass and metals are both wetted by the active solder alloy and can thus be joined by the various embodiments of this invention.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A process for joining workpieces by active soldering comprising the steps of:

(a) cleaning the surfaces of the workpieces to be joined;

(b) heating the workpieces to be joined;

(c) placing an active, low-temperature solder material on at least one of the surfaces of the workpieces to be joined;

(d) mechanically activating the molten solder material while the solder material contacts the surfaces of the workpieces to be joined;

(e) assembling the surfaces of the workpieces to be joined; and (f) applying pressure to the surfaces of the workpieces to be joined both while the solder material is molten and as the solder material cools to a solid.

2. The process of claim 1 further comprising the step, before the step (c) of placing the solder material, of providing the solder material as one of powder, paste, tape, shot, pellets, ribbon, foil, sheet, and wire.

3. The process of claim 2 wherein the solder material has at least 1% by weight of an element or a mixture of elements selected from subgroups IVa and Va of the periodic table, at least 0.01% by weight of an element or a mixture of elements of the lanthanide group, optionally at least 0.5% by weight of an element selected from the group of silver, copper, indium, and a mixture of one or more of those elements, optionally at least 0.01% by weight of gallium, and the remainder selected from the group consisting of tin, lead, a mixture of tin and lead, and zinc.

4. The process of claim 1 wherein the step (d) of mechanically activating the molten solder material comprises brushing.

5. The process of claim 1 wherein the step (d) of mechanically activating the molten solder material comprises thermal spraying.

6. The process of claim 1 wherein the step (d) of mechanically activating the molten solder material comprises friction coating.

7. The process of claim 1 wherein the step (d) of mechanically activating the molten solder material comprises ultrasonic bath coating.

8. The process of claim 1 wherein the step (d) of mechanically activating the molten solder material comprises solder pre-placement and pressure.

9. The process of claim 1 wherein the step (d) of mechanically activating the molten solder material comprises ultrasonic press.

10. The process of claim 1 wherein the step (d) of mechanically activating the molten solder material comprises abrasion transfer.

11. The process of claim 1 wherein the step (b) of heating the workpieces to be joined raises the temperature of the solder material placed on at least one of the surfaces of the workpieces to a temperature of 200° C. to 450° C.

12. The process of claim 11 wherein the step (b) of heating the workpieces to be joined raises the temperature of the solder material placed on at least one of the surfaces of the workpieces to a temperature of 250° C. to 280° C.

13. The process of claim 1 wherein the step (b) of heating the workpieces to be joined uses at least one of a soldering iron, a soldering flame, plate heating, hot-air heating, ultrasonic heating, induction heating, and resistance heating.

14. The process of claim 1 wherein the pressure applied in step (f) ranges from 10 to 60 psi.

15. The process of claim 14 wherein the pressure is maintained until the solder material cools to at least 50° C. below the solder temperature.

16. The process of claim 1 wherein the solder material is placed on both of the surfaces of the workpieces to be joined.

17. The process of claim 1 further comprising the step, before the step (a) of cleaning the surfaces of the workpieces to be joined, of roughening the surfaces.

18. The process of claim 1 further comprising the step of monitoring the joining temperature with a temperature indicator.

19. The process of claim 1 wherein the process is conducted under ambient air conditions.

20. The process of claim 1 further comprising the step, after the step (e) of assembling the surfaces of the workpieces to be joined, of applying conventional solder joining techniques.

21. The process of claim 1 further comprising the step of filling gaps and fillets with a supplemental solder filler material.

22. The process of claim 21 wherein the supplemental solder filler material is about 96.5% tin and 3.5% silver.

23. A process for joining workpieces by active soldering under ambient air conditions comprising the steps of:

(a) providing an active, low-temperature solder material having at least 1% by weight of an element or a mixture of elements selected from subgroups IVa and Va of the periodic table, at least 0.01% by weight of an element or a mixture of elements of the lanthanide group, optionally at least 0.5% by weight of an element selected from the group of silver, copper, indium, and a mixture of one or more of those elements, optionally at least 0.01% by weight of gallium, and the remainder selected from the group consisting of tin, lead, a mixture of tin and lead, and zinc;

(b) cleaning the surfaces of the workpieces to be joined;

(c) placing the solder material on at least one of the surfaces of the workpieces to be joined;

(d) heating the workpieces to be joined to raise the temperature of the solder material placed on at least one of the surfaces of the workpieces to a temperature of 200° C. to 450° C.;

(e) mechanically activating the molten solder material, while the solder material contacts the surfaces of the workpieces to be joined, by at least one of brushing, thermal spraying, friction coating, ultrasonic bath coating, solder pre-placement and pressure, ultrasonic press, and abrasion transfer;

(f) assembling the surfaces of the workpieces to be joined; and (g) applying pressure to the surfaces of the workpieces to be joined both while the solder material is molten and as the solder material cools to a solid.

24. The process of claim 23 wherein the step (d) of heating the workpieces to be joined raises the temperature of the solder material placed on at least one of the surfaces of the workpieces to a temperature of 250° C. to 280° C.

25. The process of claim 23 wherein the pressure applied in step (g) ranges from 10 to 60 psi.

26. The process of claim 23 wherein the pressure is maintained until the solder material cools to at least 50° C. below the solder temperature.

27. The process of claim 23 wherein the solder material is placed on both of the surfaces of the workpieces to be joined.

28. The process of claim 23 further comprising the step, before the step (b) of cleaning the surfaces of the workpieces to be joined, of roughening the surfaces.

29. The process of claim 23 further comprising the step of monitoring the joining temperature with a temperature indicator.

30. The process of claim 23 further comprising the step, after the step (f) of assembling the surfaces of the workpieces to be joined, of applying conventional solder joining techniques.

31. The process of claim 23 further comprising the step of filling gaps and fillets with a supplemental solder filler material.

32. The process of claim 31 wherein the supplemental solder filler material is about 96.5% tin and 3.5% silver.

33. A process for joining workpieces by active soldering under ambient air conditions comprising the steps of:

(a) providing an active, low-temperature solder material having at least 1% by weight of an element or a mixture of elements selected from subgroups IVa and Va of the periodic table, at least 0.01% by weight of an element or a mixture of elements of the lanthanide group, optionally at least 0.5% by weight of an element selected from the group of silver, copper, indium, and a mixture of one or more of those elements, optionally at least 0.01% by weight of gallium, and the remainder selected from the group consisting of tin, lead, a mixture of tin and lead, and zinc;

(b) roughening the surfaces of the workpieces to be joined;

(c) cleaning the surfaces of the workpieces to be joined;

(d) placing the solder material on at least one of the surfaces of the workpieces to be joined;

(e) heating the workpieces to be joined to raise the temperature of the solder material placed on at least one of the surfaces of the workpieces to a temperature of 200° C. to 450° C.;

(f) mechanically activating the molten solder material, while the solder material contacts the surfaces of the workpieces to be joined, by at least one of brushing, thermal spraying, friction coating, ultrasonic bath coating, solder pre-placement and pressure, ultrasonic press, and abrasion transfer;

(g) assembling the surfaces of the workpieces to be joined;

(h) applying pressure ranging from 10 to 60 psi to the surfaces of the workpieces to be joined while the solder material is molten; and (i) maintaining the applied pressure until the solder material cools to at least 50° C. below the solder temperature and becomes a solid.

34. The process of claim 33 wherein the step (e) of heating the workpieces to be joined raises the temperature of the solder material placed on at least one of the surfaces of the workpieces to a temperature of 250° C. to 280° C.

35. The process of claim 33 wherein the solder material is placed on both of the surfaces of the workpieces to be joined.

36. The process of claim 33 further comprising the step of monitoring the joining temperature with a temperature indicator.

37. The process of claim 33 further comprising the step, after the step (g) of assembling the surfaces of the workpieces to be joined, of applying conventional solder joining techniques.

38. The process of claim 33 further comprising the step of filling gaps and fillets with a supplemental solder filler material.

39. The process of claim 38 wherein the supplemental solder filler material is about 96.5% tin and 3.5% silver.

* * * * *

UNITED STATES PATENT AND TRADEMARK OFFICE
CERTIFICATE OF CORRECTION

PATENT NO. : 6,047,876
DATED : April 11, 2000
INVENTOR(S) : Ronald W. Smith et al.

It is certified that error appears in the above-identified patent and that said Letters Patent is hereby corrected as shown below:

On the Title page, item [75], add the following inventors:
Erich Lugscheider, Aachen, Germany; Frank Hillen, Hükelhoven, Germany; Ino J. Rass, Aachen, Germany Column 1,
After line 5, insert as a new paragraph -- Government Rights The U.S. Government has a paid-up license in the present invention and the right in limited circumstances to require the patent owner to license others on reasonable terms as provided for by the terms of Contract No. NAS1-97023 awarded by the National Aeronautics and Space Administration.--

Column 2,
On the last line, insert a space after "excellent".

Column 3,
Line 49, delete "SuperBrazem" and insert --SuperBraze$^{TM}$--.

Column 7,
Line 27, delete "s".

Signed and Sealed this

Third Day of July, 2001

*Attest:*

*Attesting Officer*

NICHOLAS P. GODICI
*Acting Director of the United States Patent and Trademark Office*